Patented June 24, 1947

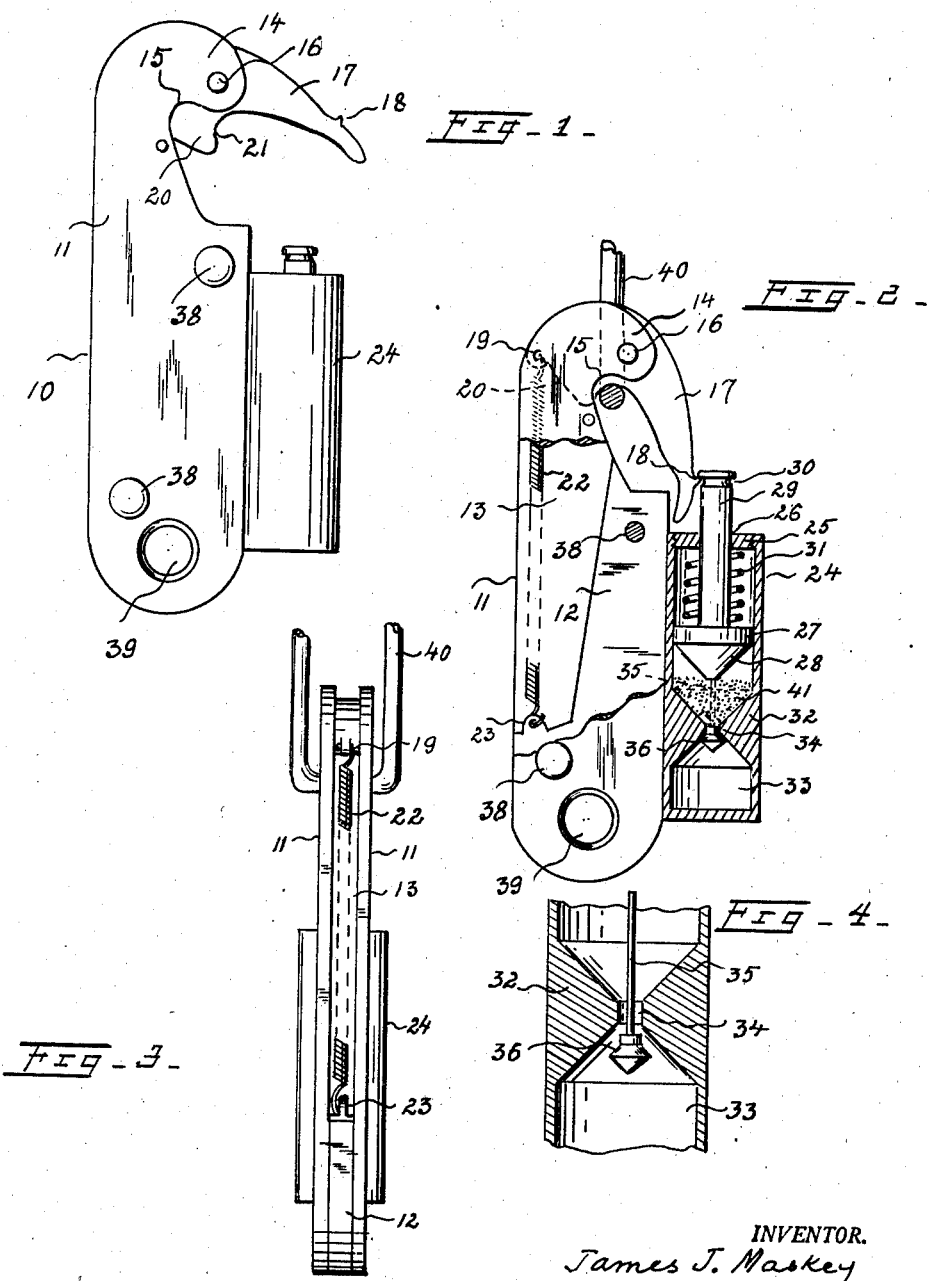

2,422,839

UNITED STATES PATENT OFFICE 2,422,839

RELEASE COUPLING FOR PARACHUTES

James J. Maskey, Detroit, Mich.

Application August 17, 1945, Serial No. 611,202

5 Claims. (Cl. 294—83)

My invention refers to improvements in automatic release couplings for use with loads to be released from an airplane by means of a parachute.

The object of my invention is to provide a device which, serving as a coupling between a parachute and a load, will automatically release the parachute at the moment of landing of the load on the ground.

A specific purpose of my invention is to provide a device in which means of securely retaining a suspension link of a parachute during the period of descent of a load are separate but in a cooperative combination with means to release the parachute on landing.

I wish to point out that this separation of respective means for retention and release of a suspension link is an important feature of my invention, as the success of the coupling depends to a great deal on said separation of elements within the body of the coupling.

I shall now describe my invention with reference to the accompanying drawings, in which:

Fig. 1 is a plan elevation of my release coupling;

Fig. 2 is a plan elevation of my coupling with parts broken off for better view, other parts shown in section, and elements shown in different operative position. A fragmentary view of a suspension link is also shown in this figure;

Fig. 3 is the left side edge view of the coupling shown in Fig. 2, with a fragmentary view of a parachute suspension link.

Fig. 4 is an enlarged view of a detail shown in Fig. 3.

Similar numerals refer to similar parts throughout the several views.

The coupling includes a body section made of two oblong plates 11 and an intermediate spacing plate 12, all held together by bolts 38. Plate 12 is restricted in area so as to leave a free space 13 between said plates 11 as best shown in Fig. 2. At the upper end, plates 11, being in a spaced relation to each other, form a rounded head 14, looping back upon the body which is generally indicated by numeral 10, thus to form a shallow inverted hook 15. Supplementing the hook formation is a claw 17, having a broad shank 20 and tapering to a substantially pointed end. The claw is pivoted, midway its length, within head 14 by means of a pin 16, is provided with a spur 18, and includes an inwardly extending curve 21 in said base 20. From eye 19, being a part of shank 20, a coiled spring 22 extends downwardly to eye 23 on spacing member 12. A part of plate 11 is broken off in Fig. 3, to disclose the location of the spring in space 13. Under the tension of the spring, the claw assumes normally the position shown in Fig. 1, this being its open position, in which the claw is disposed at an angle to the axis of body 10. At the lower end said body is provided with an aperture 39 for suspension of loads.

Claw 17 serves to retain suspension link 40 within the coupling, the operative position of the claw being controlled in part by rod 29. This I shall describe in conjunction with a cylinder 24 affixed to body 10 of the coupling in a parallel position to its longitudinal axis. The cylinder is closed at bottom, contains a threaded closure 25 at top, with a central aperture 26, and accommodates a piston 27 having on its lower side an inverted conical head 28. Rod 29 is mounted axially on the piston, extends from the cylinder upwardly through said aperture 26, and is provided with an annular groove 30 adjacent its upper end. The aperture is loose enough to permit passage of air between the outer surface of the rod and the inner surface of said aperture. A spring 31 coiled around rod 29 bears at one end against said closure 25 and at the other end against piston 27, urging same downwardly. The lower part of the cylinder contains an hour glass partition 32 with a central passage 34. A free space 33, below said partition, is normally filled to a part of its capacity with sand 41 of fine texture, adapted to pour easily through said central passage 34. As a means of preventing the flow of sand during periods when this is undesirable, closure 36 is used, said closure being mounted on stem 35 extending downwardly from piston 27, as shown. The closure is made to fit into said passage 34 from its bottom end.

I shall now describe the manner of use and operation of my coupling. Before the coupling may be applied for the purpose for which it is intended, the sand normally in the lower part 33 of cylinder 24 must be allowed to pass to the upper chamber above the hour glass partition. This is done by holding the coupling upside-down, so that portion 33 of cylinder 24 is above said piston 27. While the coupling is in this upside-down position, the parachute suspension link 40 may be placed within the space between body 10 of the coupling and claw 17, the latter being in its open position, as shown in Fig. 1. Thereupon, the claw, pivotally held within head 14 is swung against the tension of spring 22 towards the body of the coupling to a position shown in Fig. 2, and to maintain the claw in this position, rod 29 is drawn out of cylinder 24 until spur 18 of the claw had entered annular groove 30 on said rod. The tension of spring 22 makes the engagement between the spur and the annular groove secure against jolts and reliable in preventing an unintentional release of said link 40 out of the coupling. The withdrawal of the rod for the purpose of engaging the spur causes also closure 36 to fit into passage 34 in said hour glass formation, so that sand above said passage will not be permitted to flow down into lower portion 33 of said cylinder 24.

It will be noted that the inner curve 21 of claw 17, in its closed position, extends slightly beyond the marginal outline of the hook formation 15 of the upper portion of the coupling, as shown in Fig. 2. It will be assumed now that the coupling is affixed to a load by means of aperture 39, that a suspension link 40, being a part of the parachute assembly, is placed within the coupling, and that the load thus attached to the parachute by means of my coupling has been released from a plane. On opening of the parachute the descent of the load will be abruptly checked. The initial thrust of the load will be transferred to the inner curve 21 of claw 17, at the point where the suspension link 40 bears against said curve from within the coupling a little to the inner side of the pivotal mounting 16, that is towards the longitudinal axis of the coupling. This causes the shank 20 of the claw to swing upwardly against the tension of spring 22. The swing, though limited by the unyielding outlines of plates 11 at 15, is sufficient to allow spur 17 to be withdrawn from annular groove 30. As a result thereof, spring actuated rod 29, begins to descend back into cylinder 24. The descent, however, is retarded by the volume of sand blocking the piston on which the rod is mounted. As the first downward movement of the piston lowers closure 36 opening passage 34 between the upper and the lower chamber of cylinder 24, sand is permitted to pour slowly into said lower chamber and with the diminishing volume of sand in the upper chamber the piston proceeds downwardly removing rod 29 out of the way of the claw. After the initial thrust of the load, the pressure against curve 21 of the claw decreases till it substantially corresponds to the weight of the load, permitting the claw to assume a semi-closed position. When finally the load touches the ground or other solid support, the claw will fly open under the action of spring 22 to a position shown in Fig. 1, permitting link 40 to slip out of the coupling.

In the description of my coupling, I have limited myself to the disclosure of the hour glass construction to secure a retarded withdrawal of rod 29 into cylinder 24. Obviously other means may be used for the purpose. Similarly changes may be made in the construction of the body of the coupling and the operative parts thereof. I believe that the improvement shown by me discloses the application of a new principle and a new inventive combination of its elements.

What I, therefore, wish to claim is as follows:

1. A coupling of the kind described including a body, forming in its upper portion a shallow inverted hook, a claw pivotally mounted in said upper portion of the body and adapted to be swung against said body to close the open side of the hook, the claw including a shank having an inwardly curved outline for reception of a parachute suspension link adapted to bear against said shank from below, a retractable rod adapted to be brought manually against the side of the claw to retain it in a link enclosing position, means in the lower end of the coupling for attachment to a load, the initial application of the load to the coupling causing said suspension link to bear against the shank of the claw to disengage same from contact with the rod, automatic means to cause the withdrawal of the rod from the path of the claw, and spring means to swing the claw to open position on cessation of the pull of the load.

2. A coupling for parachute delivery of loads, said coupling including a body forming in its upper portion a shallow inverted hook, a claw provided with a shank and pivotally mounted midway its length in said upper portion of the body to be swung manually against said body to enclose a parachute suspension link, said link being adapted to bear from below against said shank; a retractable rod, adapted to be brought manually into engagement with the side of the claw to retain said claw in its link enclosing position; means in the lower portion of the body for attachment of a load, the claw being responsive to the initial application of the load against the shank on opening of the parachute to disengage the rod, automatic means to cause withdrawal of the rod from the path of the claw, and spring means affixed to said shank to swing the claw to open position on cessation of the pull of the load.

3. A coupling of the kind described including a body having in its upper portion the form of a shallow inverted hook, a member pivotally mounted in said upper portion and including a shank to one side of its pivoted mounting, and a claw to the other side thereof, spring means to keep the claw in a normally open position, the claw being adapted to be swung manually from its pivotal point against the body of the coupling to enclose a suspension link, permitting said link to bear against said shank from below, a retractable rod adapted to be brought manually against the side of the claw, spur means on said claw to engage a recess on the rod and the claw being responsive to the initial application of the load against the shank on opening of the parachute to disengage the rod, automatic means to cause withdrawal of the rod from the path of the claw to its open position, said automatic means including an hour glass formation employing spring means to actuate the rod, and a volume of sand pouring through a restricted passage to retard said withdrawal, and spring means affixed to said shank to swing the claw to open position on cessation of the pull of the load following retraction of the rod.

4. As a part of my coupling, an upright cylinder closed at both ends, an hour glass partition therein, dividing the cylinder into two chambers, one below and one above said partition, a restricted passage in said partition a moveable piston in the upper chamber serving as a support of a rod extending through the upper wall of the cylinder, a compressible spring between the piston and said top wall, a volume of loose sand adapted to pour through said restricted passage, the body of said sand serving as a means of retarding the movement of the piston under the action of the spring, and a closure to be connected to the piston in a spaced relation thereto, to block the passage from below during the inoperative period of the piston.

5. A coupling of the kind described, including a flat elongated body, indented in its upper part to form a downwardly opening hook, a member pivoted in said upper part of the body and including at one end, a shank recessed for reception of a suspension link of a parachute, and a claw at its other end, said claw being adapted to be swung from its pivotal point to block the open side of the hook to enclose said suspension link therein, spring means to keep the claw in a normally open position, a retractable rod adapted to be brought manually into an interlocking engagement with the claw to keep it in its hook blocking position, means for application of a load to the lower end of the coupling, the shank of the claw being responsive to the pull of the load to cause said claw to be disengaged from the rod, and automatic means to cause the rod on its disengagement from the claw to withdraw from the path thereof to its normally open position.

JAMES J. MASKEY.

REFERENCES CITED

The following references are of record in the file of this patent:

UNITED STATES PATENTS

| Number | Name | Date |
|---|---|---|
| 2,131,445 | Lawton | Sept. 27, 1938 |
| 2,386,932 | Cooper | Oct. 16, 1945 |

FOREIGN PATENTS

| Number | Country | Date |
|---|---|---|
| 118,090 | Australia | Feb. 2, 1944 |
| 143,348 | Great Britain | May 27, 1920 |